United States Patent [19]

Schwartz et al.

[11] Patent Number: 5,170,279
[45] Date of Patent: Dec. 8, 1992

[54] METHOD AND APPARATUS FOR CALIBRATING AND IMPROVING LINEARITY OF SYSTEM FOR SCANNING MOVING OBJECTS

[76] Inventors: Nira Schwartz; Arie Shahar, both of 2800 Plaza Del Amo #187, Torrance, Calif. 90503

[21] Appl. No.: 786,554

[22] Filed: Nov. 1, 1991

[51] Int. Cl.⁵ .......................................... G02B 26/08
[52] U.S. Cl. .................................. 359/217; 356/385; 359/900
[58] Field of Search .................... 359/216-219, 359/223, 225, 226, 900; 250/234-236; 356/385, 386, 387; 358/105, 486, 474

[56] References Cited

U.S. PATENT DOCUMENTS 3,602,571 8/1971 Noris, Jr. .......................... 359/216
4,632,503 12/1986 Karlsson .......................... 359/217

Primary Examiner—Bruce Y. Arnold
Assistant Examiner—James Phan
Attorney, Agent, or Firm—David Pressman

[57] ABSTRACT

A method for calibrating and improving linearity of a system for scanning moving objects. A type of scanning system and a set of parameters to define the scanning system are selected. A set of initial values for some of the parameters are also selected and mathematical equations are derived which describe physical movements of the scanning and relationships between the parameters. The equations are solved to find values for the parameters with which the objects are scanned by an incident light with linearity and a predetermined accuracy. The parameters of the scanning system are then set to the values obtained by solving the equations. The system itself consists of a rotating polygon (34) and a rotating carousel (42) having predetermined axes of their rotation. The polygon (34) has a plurality of facets (46) which are symmetric with respect to the polygon's axis of rotation. The carousel supports objects, such as bottles (36, 37, ... 41) which also may have spinning motions. The system may operate in a reading mode when objects are illuminated by an incident light beam which is reflected and is directed to a processing unit, or in a writing mode when the surfaces of the objects are treated, e.g., by a laser beam for engraving marks while the objects are moved by the carousel (42) and spin around their own axes.

36 Claims, 15 Drawing Sheets

FIG 3 – Prior Art $\Omega$ = omega $\Omega$ = omega
$\mu$ = mu

| ß | d(ß) | ∂ | d(∂) | S | d(S) |
|---|---|---|---|---|---|
| .5235988 | | .4712391 | | 18.84957 | |
| .5759587 | .05235988 | .5343226 | .06308344 | 21.3729 | 2.523337 |
| .6283186 | .05235988 | .5972377 | .06291515 | 23.88951 | 2.516606 |
| .6806785 | .05235994 | .660026 | .06278831 | 26.40104 | 2.511534 |
| .7330383 | .05235982 | .7227326 | .06270653 | 28.9093 | 2.508261 |
| .7853983 | .05235994 | .7853986 | .06266606 | 31.41594 | 2.506642 |
| .8377581 | .05235982 | .8480636 | .06266505 | 33.92255 | 2.506603 |
| .890118 | .05235994 | .9107708 | .06270713 | 36.43083 | 2.508286 |
| .9424778 | .05235982 | .9735596 | .06278885 | 38.94238 | 2.511551 |
| .9948378 | .05235994 | 1.036474 | .06291449 | 41.45897 | 2.516583 |
| 1.047198 | .05235982 | 1.099558 | .06308377 | 43.98232 | 2.52335 |

Polygon's Radius r = 16.63289 cm $\partial$ = gamma

ß = beta $d(\partial)$ = d(gamma)

d(ß) = d(beta)

FIG 9

| ß | d(ß) | ∂ | d(∂) | S | d(S) |
|---|---|---|---|---|---|
| .5235988 | | .5235985 | | 20.94394 | |
| .5759587 | .05235988 | .575959 | .0523606 | 23.03836 | 2.094423 |
| .6283186 | .05235988 | .6283193 | .05236024 | 25.13277 | 2.09441 |
| .6806785 | .05235994 | .680678 | .05235875 | 27.22712 | 2.094349 |
| .7330383 | .05235982 | .7330386 | .0523606 | 29.32155 | 2.094425 |
| .7853983 | .05235994 | .7853986 | .0523600 | 31.41594 | 2.094399 |
| .8377581 | .05235982 | .8377584 | .05235976 | 33.51034 | 2.094391 |
| .890118 | .05235994 | .8901184 | .05.236006 | 35.60474 | 2.094402 |
| .9424778 | .05235982 | .9424781 | .0523597 | 37.69912 | 2.094387 |
| .9948378 | .05235994 | .9948384 | .0523603 | 39.79354 | 2.094414 |
| 1.047198 | .05235982 | 1.047198 | .05235964 | 41.88793 | 2.094387 |

Polygon's Radius r = 20.70548 cm

∂ = gamma

ß = beta d(∂) = d(gamma)

d(ß) = d(beta)

FIG 10

| ß | d(ß) | ∂ | d(∂) | S | d(S) |
|---|---|---|---|---|---|
| .5235988 | | .2618027 | | 10.47211 | |
| .5759587 | .05235988 | .3665216 | .1047189 | 14.66086 | 4.188755 |
| .6283186 | .05235988 | .4712417 | .1047201 | 18.84967 | 4.188803 |
| .6806785 | .05235994 | .5759599 | .1047182 | 23.03840 | 4.188728 |
| .7330383 | .05235982 | .6806794 | .1047195 | 27.22718 | 4.188780 |
| .7853983 | .05235994 | .7853986 | .1047192 | 31.41594 | 4.188769 |
| .8377581 | .05235982 | .8901178 | .1047192 | 35.60471 | 4.188767 |
| .8901180 | .05235994 | .9948369 | .1047192 | 39.79348 | 4.188767 |
| .9424778 | .05235982 | 1.099556 | .1047190 | 43.98224 | 4.188763 |
| .9948378 | .05235994 | 1.204275 | .1047192 | 48.17101 | 4.188767 |
| 1.047198 | .05235982 | 1.308994 | .1047192 | 52.35977 | 4.188767 |

Polygon's Radius  r = 0.0002059937 cm

∂ = gamma

ß = beta d(∂) = d(gamma)

d(ß) = d(beta)

FIG 11

METHOD AND APPARATUS FOR CALIBRATING AND IMPROVING LINEARITY OF SYSTEM FOR SCANNING MOVING OBJECTS

BACKGROUND

1. Field of the Invention

The invention relates generally to the field of quality control, in particular to the method and apparatus for calibrating and improving the linearity of a system for scanning moving objects on a production line.

2. Cross References to Related Applications

The present patent application is related to our copending applications, Ser. No. 07/680,306, filed Apr. 4, 1991, and Ser. No. 07/660,542, filed Feb. 25, 1991.

3. Description of Prior Art

Many mass-produced items must be inspected prior to shipment. E.g., beverage bottles must be inspected for flaws prior to filling to prevent breakage in use and consequent lawsuits, injuries, property damage, etc.

Automated inspection machines which analyze images by means of video cameras and computers are known and are used, e.g., for one-step detection of defects in such products as bottles moving on a production line. However, products of more complicated shape, such as screws, required several image inspection steps. In this case, images taken by a video camera are stored in the memory of a computer so that they can be processed for detecting defects. Today industry increasingly demands higher-speed inspection techniques. Some production lines operate with an throughput of 2000 products per minute and with the time interval for inspecting a product as short as 30 milliseconds. Also there is a strong demand that the video images be sharp so as to make it possible to perform efficient defect detection.

In a writing cycle, where a laser beam is used to engrave marks on a product, there is a strong demand for writing sharp marks regardless of high speed movement of the products on the production line.

One type of inspection machine currently used in the market today inspects or engraves prodcuts such as bottles, mounted on a rotary carousel. Such a machine is made by Krones AG., Altestrasse 111, D-5020 Frechen, Germany. Light reflected from each bottle is sent to camera (in a reading cycle), or light is sent from a laser light source to the bottle (in a writing cycle).

In both cases the light beam is guided through a scanning device which controls the accuracy of the beam's movement. In order to provide a sharp image (reading cycle), or sharp marks engraving (writing), the scanning device must possess two important features.

The first feature is linearity, i.e., the ability to cause the light beam to follow a fixed point on a rotating carousel (writing), or to insure that the light reflected from the bottle always comes to an image sensor from a fixed point on the carousel (reading).

The second feature is the requirement of maintaining a fixed optical path. I.e., during rotation of the carousel the optical distance between the light source and the camera (reading), or between the light source on the carousel (writing) should remain constant.

This linear scanning device is shown in FIG. 1 and is described also in the product data of Krones AG. It is essentially a back-and-borth rotating mirror. However it provides insufficiently sharp images when reading, or insufficiently sharp marks when engraving (writing).

The tracking system of FIG. 1 consists of rotating mirror M, which has rotating axis at point (Xm, Ym). Also it uses a rotating carousel 11 having an axis of rotation at point (0,0) which is the origin of coordinates X,Y (not shown). Carousel 11 rotates with an angular velocity $\Omega_{11}$. Objects, such as bottles 15 to 20, are located on the circumference of a circle centered at (0,0). The objects are distributed uniformly on carousel 11 and rotate therewith. The bottles may also rotate or spin on their own axes (not indicated). The arc between two adjacent objects is related to the center (0,0); it is called a periodic tracking arc.

An incident beam 12 originates at point (X0,Y0) and is directed toward rotating mirror M. Beam 12 is reflected from mirror M as a tracking beam 14 which falls onto an bottle 20 on carousel 11. As mirror M rotates, beam 14 tracks the movement of bottle 20. The final position of mirror M is shown by broken line M'. In the periodic rotation the mirror swings across an angle $\beta_M$, (beta$_M$). In that final position, the beam reflected from mirror M is also shown by broken line 14'. To follow bottle 20 to the position of a second bottle 15, one full periodic rotation of mirror M for angle $\beta_M$ reflects the tracking beam at view angle $\partial_M$ (gamma$_M$). While bottle 20 advances to the position of bottle 15, the latter assumes the position of a third bottle 16. Incident beam 12 remains static.

The basic optical rule for an incident beam and the beam reflected from a mirror M is that periodic mirror rotation angle $\beta_M$ should be half of view angle $\partial_M$. After tracking bottle 20 over angle $\partial_M$, mirror M quickly returns to its initial position shown in solid-line form.

The process and apparatus described above involves back-and-forth rotations or oscillations of mirror M over angle $\beta_M$. Such back-and-forth motions create vibrations, resulting in optical distortions and accelerations that cause deviation from the linear relationship described earlier.

FIG. 2 illustrates another prior-art system. This system consists of a rotating polygon 22, a carousel 24 and rotating mirror M1. The system has two tracking paths: one with a rotating polygon 22 and the second with a rotating mirror M1. Carousel 24, polygon 22, and mirror M1 are mounted on the same axis of rotation.

Point (0,0) is the origin of coordinates X,Y (not shown). Both polygon 22 and mirror M1 rotate with the same angular velocity $\Omega_{10}$ and therefore have the same angle of rotation. The initial positions of both are shown by solid lines and their final positions by broken lines. An incident beam 26 originates at point (X0,Y0) and crosses the carousel's circumference at point (Xc,Yc). It then hits facet 28 of the polygon at a right angle at point (X5,Y5) and mirror M1 at point (0,0). Then the beam is reflected back along a line (0,0)-(X0,Y0).

Incident beam 26 originates at point (X0,Y0) and crosses the carousel circumference at point (Xc,Yc). The final position of the polygon is shown in broken lines. The beam then hits polygon facet 28 (which now in position 28') at point (X6,Y6) and is reflected as beam 30 that hits the carousel in point (X3,Y3). Beam 26 also hits mirror M1 at point (0,0) and is reflected as beam 32 that hits carousel 24 at point (X4,Y4).

The optical path for the beam that hits and then is reflected from mirror M1 in the initial position of the mirror is twice the distance (Xc,Yc)-(0,0). In the final position of the mirror the optical path is twice the distance (Xc,Yc)-(0,0)-(X4,Y4). In both cases the distance equals twice the carousel's radius (0,0)-(Xc,Yc), i.e., it is a constant value.

An optical law for mirrors states that the angle of reflection from a mirror is equal to the incident angle. So by choosing a gear ratio of 2 to 1 between the carousel and mirror M1 we get a linear tracking movement of mirror M1. The process described above involves back-and-forth rotations of mirror M1 over axis (0,0). Similar to the previously described conventional system, such back-and-forth motion creates vibrations, resulting in optical distortions and accelerations that cause deviations from the linear relationship described earlier.

As far as polygon 22 is concerned, its optical path is equal to distance (Xc,Yc)-(X5,Y5) in the initial position of the polygon, and to (Xc,Yc)-(X3,Y3) in the final position. It is shown clearly in FIG. 2 that the optical path for polygon 22 is not equal to that of mirror M1. It is also clear from FIG. 2 that the polygon's optical path is not a constant value and depends upon the angle of rotation and the radius of polygon 22. The optical path will approach a constant value with a decrease in the polygon's radius r, and when r approaches 0, the polygon's behavior will approach that of a mirror.

This clearly demonstrates that a conventional polygon is not equivalent to a centered mirror, i.e., the conventional polygon does not have a tracking behavior equivalent to centered mirror M1 and also does not have a constant optical path like the mirror does.

Nevertheless, a conventional scanning polygon system seems to be a suitable way to effect periodic tracking using continuous motion scanning so as to replace an oscillating scanning mirror system. Conventional polygons were used in scanning systems to scan targets having distances from the polygon which were much greater than the polygon's radius. Such scanning systems, which are known as a "Forward Looking Infra Red" (FLIR) are described in "The Photonic Design and Application Handbook", 36th edition, P. L. Jacobs, ed. (Laurin Publishing Co., Pittsfield, Mass.)

In the above case, it should be noted that the polygon's nonlinearity as a function of its radius has very little influence upon scanning quality. This means that each facet of the polygon behaves similarly to a flat mirror mounted directly on the rotation axis, ignoring the off-axis effect of the polygon's facets.

However, consider those tracking systems in which the distance of the tracking target from the polygon is not much larger than the polygon's radius. For these it is not justified to treat the polygon's facets as flat mirrors mounted direclty on the rotational axis and to ignore the off-axis effects of the polygon. The designers, however, continued to ignore the polygon's radius in their calculations. With this erroneous design approach, the polygon's radius is chosen arbitrarily, and this results in nonlinear tracking. The use of such a polygon system cannot produce sharp images in reading cycles and results in smearing of the engraved marks in writing cycles. Therefore the system shown in FIG. 2 did not find any practical application.

Also known in the art are tracking systems with tracking in two positions. One such system is described in our above copending application Ser. No. 07/680,306. It is also shown in FIG. 3 in two temporary positions.

The initial position of polygon 34 is shown in solid lines and its second position in broken lines. Bottles 36–41 on a carousel 42 are shown in thick solid lines for the first position and in thin lines for the second position. Polygon 34 and carousel 42 have their axes of rotation at point (0,0), which is the origin of coordinates X,Y. The radii of the carousel and the polygon are R and r, respectively, and their angular velocities are $\Omega_{42}$ and $\Omega_{34}$, respectively.

An incident beam 44, in the initial state, originates at point (X0,Y0) and is always static in space. It is reflected from facet 46 (solid line) as a reflected beam 48 (solid line).

In the second position, incident beam 44 is reflected from a facet 46' (broken lines) as beam 48' (broken lines).

The rotation of polygon 34 causes incident beam 44 to follow bottle 36 on the carousel. To have linear tracking, beam 48 must follow bottle 36 along the period tracking arc. The carousel's radius vector follows a fixed point on its circumference, from an initial tracking state (solid line) to the end of the tracking arc, where bottle 37 is now located. (An intermediate state is shown by broken line 48').

As the polygon rotates with time, incident beam 44 hits different facets of polygon 34. The process of tracking is repeated each time another bottle on the carousel is tracked. The tracking angle equals (360/Nc), where Ns is the number of bottles on carousel 42, the polygon's angle of symmetry is $\mu$ (Mu) and equals (360/Np), where Np is the number of facets on the polygon.

While the polygon rotates an angle equal to $\mu$, tracking beam 44 is not always following an object on the carousel along an angle equals to $\partial$ (tracking angle). I.e., rotating the polygon by its symmetry angle does not necessary result in a tracking angle having a size related to the periodic tracking arc.

For systems with an arbitrary relationship between the system's parameters, tracking itself is not always linear, and the beam does not have a constant optical path. Therefore this system does not guarantee reliable linear tracking with an accuracy within a required range.

In our copending application Ser. No. 07/680,306, we describe a system using a conventional polygon which is capable of maintaining linear scanning. This is achieved only under a unique relationship between the radii of the polygon and carousel, i.e., when the radius of the polygon is equal to one-half the tracking radius R divided by the cosine of an angle of 180/n, where n is integer equal to the number of bottles on the carousel.

Although this condition insures linearity, it is valid only for a polygon having a unique set of dimensions. Polygons which are beyond these specified dimensions will not provide linearity. However, there is a demand in the industry for polygons of larger or smaller dimensions, so as to have size flexibility.

However, in reality we can have some allowable deviation from the strictly theoretical linearity within a predetermined range tolerable from the practical point of view. Of course, this tolerable range of deviations will vary, depending upon the type and size of bottles being controlled. For example in a standard carbonated beverage bottle (volume 1.5 L), the allowable deviation will be 0 to 0.1 mm.

The bottles are an example of type of products that can rotate on the carousel for inspection. They can be screws, containers, medicine ampules, and so on.

Nevertheless, it has not been known how to achieve the above objective and to realize a scanning system which has dimensions deviating from the unique relationship between the polygon and the carousel, and which, at the same time, allows deviation from linearity within the desired tolerable range.

OBJECTS AND ADVANTAGES

Accordingly, several objects of the invention are to provide an improved scanning and writing system of the types described, to provide a method and apparatus for calibrating and adjusting physical dimensions of a scanning system with improved linear scanning behavior, to improve processes of reading and writing of products with the use of a conventional polygon, while the products are moving on a production line, and to improve accuracy of tracking a fixed point on a rotating carousel.

Another object is to provide a scanning system which has dimensions deviating from the unique relationship between the polygon and carousel, and which, at the same time, allows deviation from linearity within the desired tolerable range.

Still another object is to provide a scanning system consisting of a carousel for rotating objects to be scanned and a polygon with radially and lateral adjustable facets where the axis of the carousel which can be shifted with respect to the axis of the polygon.

Still further objects and advantages will become apparent a consideration of the ensuring descriptions and accompanying drawings.

REFERENCE NUMERALS USED IN THE DESCRIPTION AND DRAWINGS

M, M'—mirrors
11, 24, 42—rotating carousels
15-20, 36-41, 52-62—objects or products
12, 26, 44—incident beams
43—laser beam source
14, 30, 32, 48—reflected or tracking beams
22, 34—rotating polygon
28, 35, 46—polygon facets
45—source of light or a camera
49a—center of the bottle
51—radial arm
53—slot
80—first stage of system selection
82—second stage of system selection
84—third stage of system selection
85—forth stage of system selection

BRIEF DESCRIPTION OF DRAWINGS

In FIG. 7(a) the polygon and the carousel are on the ame axis of rotation; In FIG. 7(b) the center of rotation of the carousel is shifted off the center of rotation of the polygon to the position of negative coordinates in the XY coordinate system, but the polygon is still wtihin the contour of the carousel; IN FIG. 7(c) the center of rotation of the carousel is shifted off the center of rotation of the polygon to the positive coordinates in the XY coordinate system, but the polygon is still within the contour of the carousel; In FIG. 7(d) the carousel is mounted off the polygon axis of rotation and beyond the polygon area.

FIG. 9 (Table I) shows a list of parameters for a twelve-facet polygon and twelve bottles on the carousel, the gear ratio between the speed of rotation of carousel and the polygon being 1.2, which is a part of the invention.

FIG. 10 (Table II) shows a list of parameters for a twelve-facet polygon and twelve bottles on the carousel, the gear ratio between the speed of rotation of carousel and polygon being 1, which is a part of the invention.

FIG. 11 (Table III) shows a list of parameters for a twelve-facet polygon and six bottles on the carousel, the gear ratio between the speed of rotation of carousel and polygon being 2, which is a part of the invention.

FIG. 4—TRACKING SYSTEM PARAMETERS AND PRINCIPLE OF OPERATION

In order to understand the principle of the invention and its description, FIG. 4 is provided to illustrate a set of system parameters to define the tracking system of carousel 42 and polygon 34. Later a unique relationship between those parameters will be defined, as a set of mathematical equations.

Figure 1:
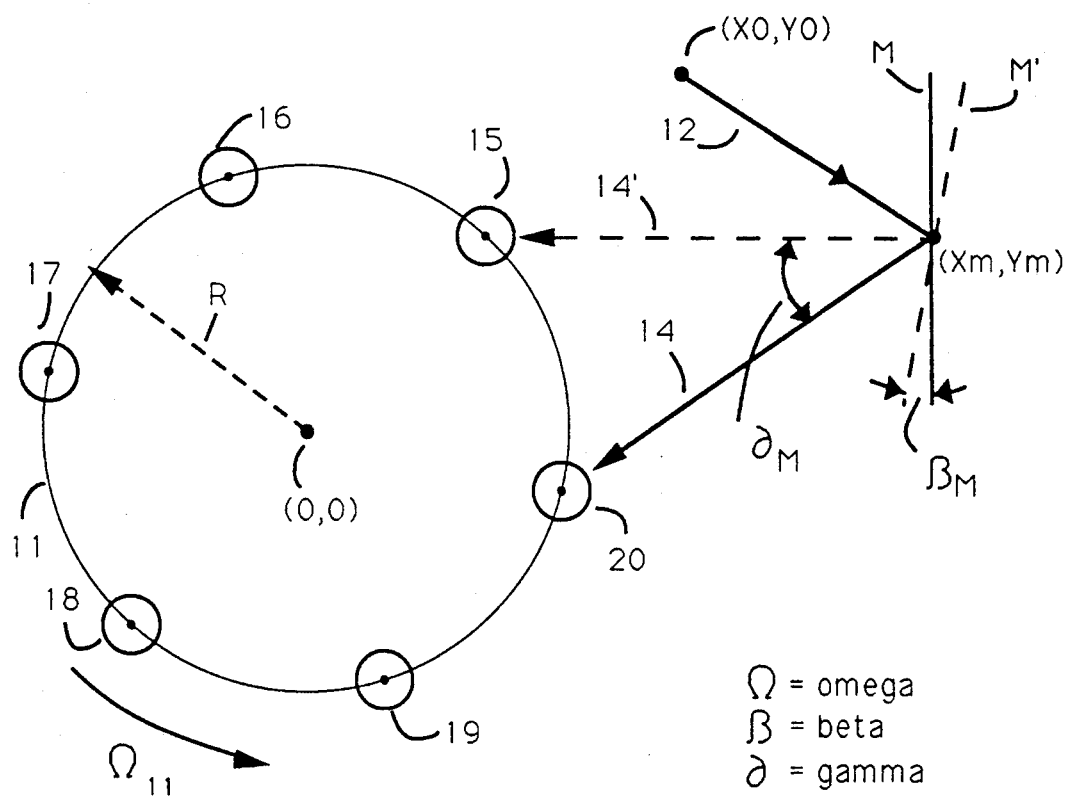
FIG. 1 is a schematic view of a conventional tracing system using a rotating mirror.
Figure 2:
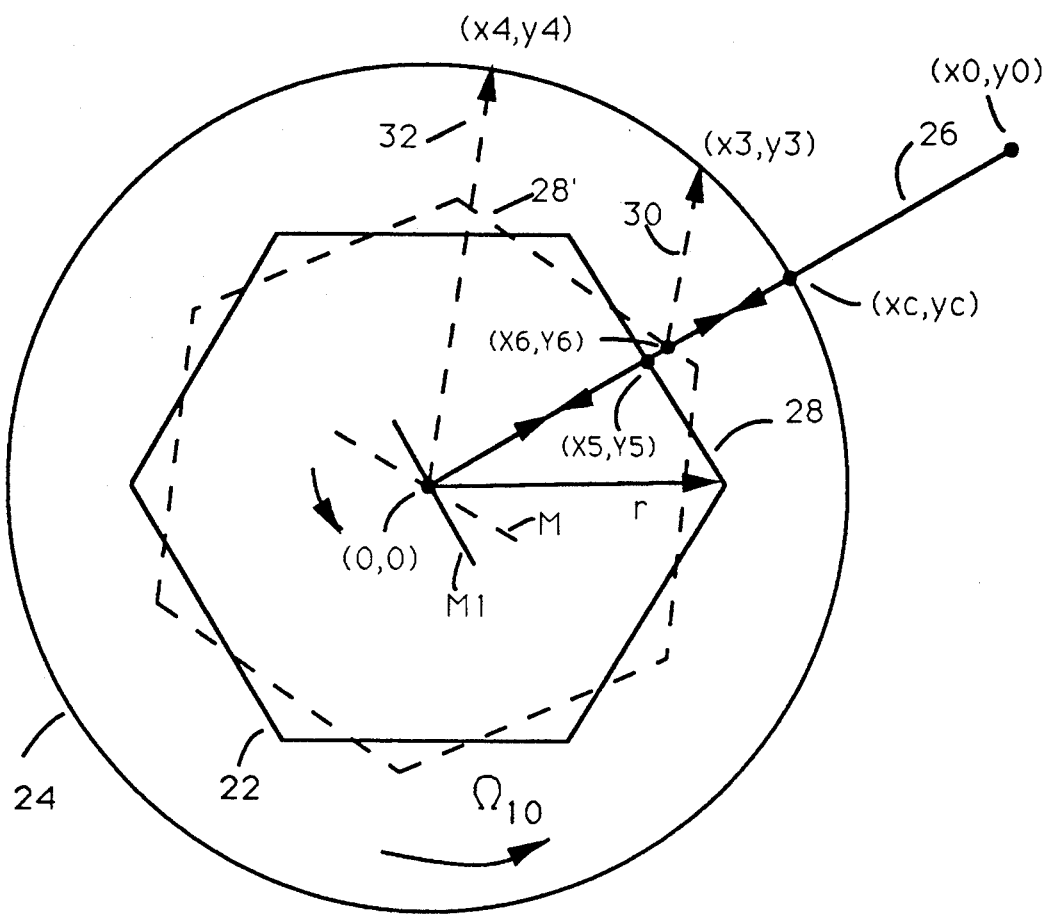
FIG. 2 shows optical path for rotating polygon and rotating mirror in conventional system.
Figure 3:
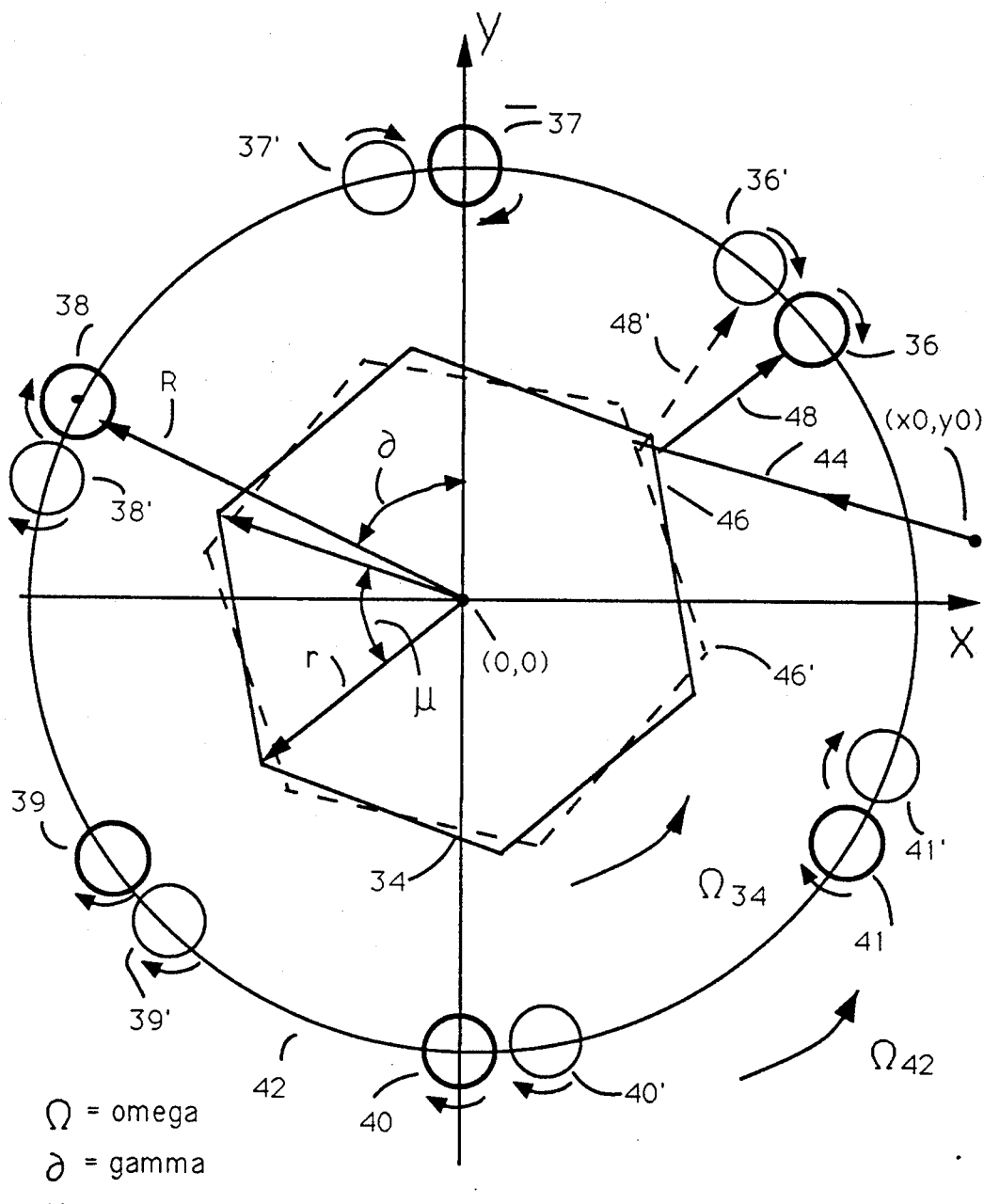
FIG. 3 shows a known system with tracking in two positions.

A unique method will be used to solve the mathematical equations and derive the parameter values. The derived parameters values are used for adjusting and calibrating the physical dimensions of the scanning system.

Perfect linearity cannot be achieved using such a system with arbitrary parameters values. However we can restrict the solution of the mathematical equations to resolve a set of parameters, so that the scanning arc of the incident beam have deviations from a theoretically perfect scanning arc within a predetermined range. I.e., the system linearity will deviate from perfect linearity within a predetermined range.

In the case considered below, carousel 42 and polygon 34 have their axes of rotation locate at point (0,0), which is the origin of coordinates (X,Y) (not shown). A more general case, where the polygon's axis of rotation is off center on the carousel will be considered later.

SYSTEM PARAMETERS AND COORDINATES

The system parameters are represented by Cartesian coordinates as follows:

(X,Y)—system coordinates
(0,0)—origin of coordinates (X,Y), i.e., polygon's axis of rotation
R,R—radii of carousel 42 and polygon 34, respectively $\Omega_{42}, \Omega_{34}$—angular velocities of carousel and polygon, respectively.

$\mu = (2 \times \text{pi})/\text{Np}$—polygon's central angle, where Np is a number of polygon sides (X2,Y2)—midcenter point of polygon facet 46

(0,0)-(X2,Y2)—a section perpendicular to facet 46

$\beta$—angle between X-(0,0)-(X2,Y2)

(X0,Y0)—point of origination of incident beam 44

(X1,Y1)—sliding point on facet 46 where hit by incident beam 44

X'—second coordinate parallel to X which originates at moving point (X1, Y1)

(X3,Y3)—point on carousel 42 marked by reflected beam 48

§-(Sigma)—angle between X' and incident beam 44

∂-(Gamma)—central tracking angle between X-(X3,Y3)-(0,0)

Np—number of polygon's facets

Figure 4:
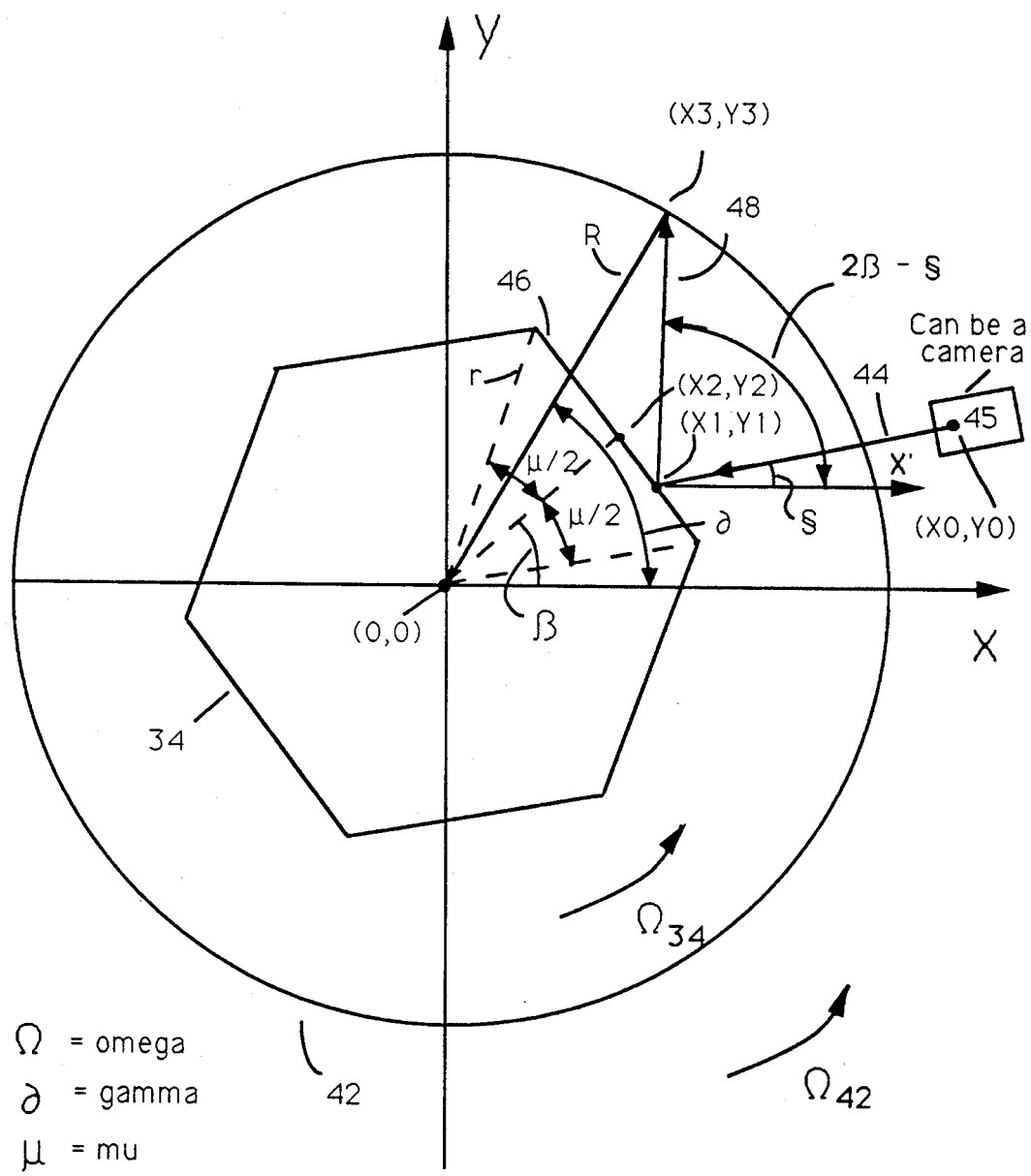
FIG. 4 is a schematic view of a known system and is provided to facilitate definition of parameters used in the description.

Nc—number of bottles on the carousel (u,v)—carousel axis of rotation in (X,Y) coordinates (u=0, v=0 in FIG. 4)

Calculated values using the above parameters for those different examples are given in FIGS. 10 to 12 by Tables I, II, and III.

An incident writing or engraving beam 44 originates from a light source 45 located at point (X0,Y0). E.g., source 45 may be a laser source. The beam hits a facet 46 of polygon 34 at point (X1,Y1). The beam creates an angle § (Sigma) to coordinate axis X', which is parallel to axis X. The beam is reflected as a tracking beam 48 at an angle (2$\beta$-§) to the coordinate axis X' and intersects a tracking circumference at point (X3,Y3). The tracking circumference is a circle of radius R on which the surfaces of bottles (not shown) are hit by the beam.

Incident beam 44 is static in space. During rotation of polygon 34 point (X1,Y1) on facet 46 "slides" along facet 46 of the polygon.

Another situation is described by reversing the propagation of the incident beam. I.e., reflected beam 48 is converted into an incident beam and incident beam 44 is converted into a reflected beam. This situation correponds to a reading cycle and can be implemented by changing source 45 to a light sensor, e.g., a video camera (not shown). The camera takes an image of a bottle and sends it to a processor (not shown) for comparison with a template and for subsequent processing.

FIG. 7(a)-7(d)—Polygon-Carousel System

Figure 7A:
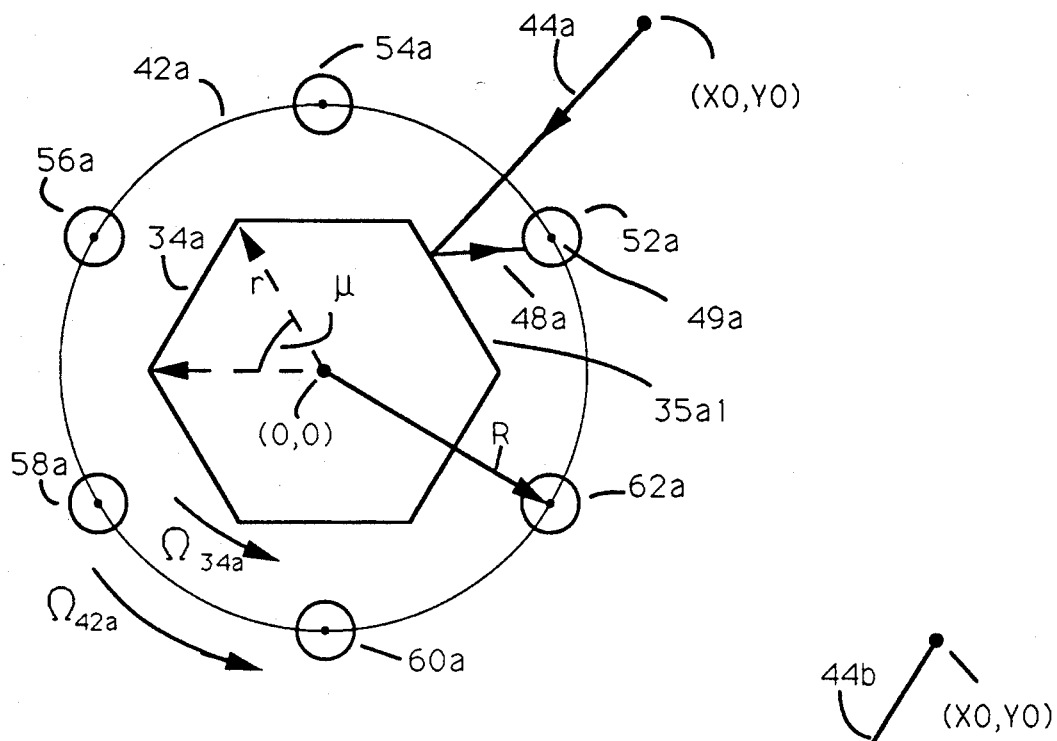
FIGS. 7(a)-7(d) are diagrams illustrating a method of the invention for accurate tracking with the use of conventional polygon.
Figure 7B:
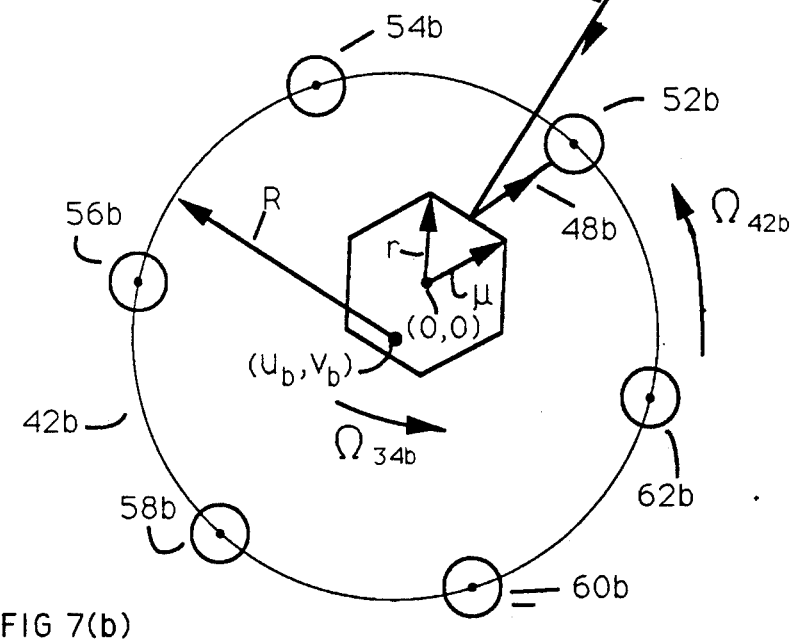
Figure 7C:
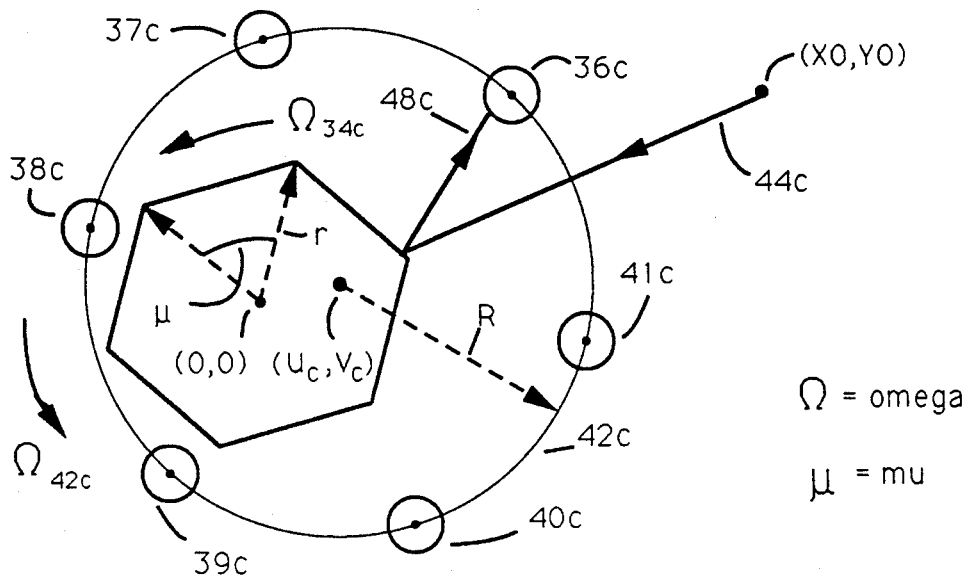
Figure 7D:
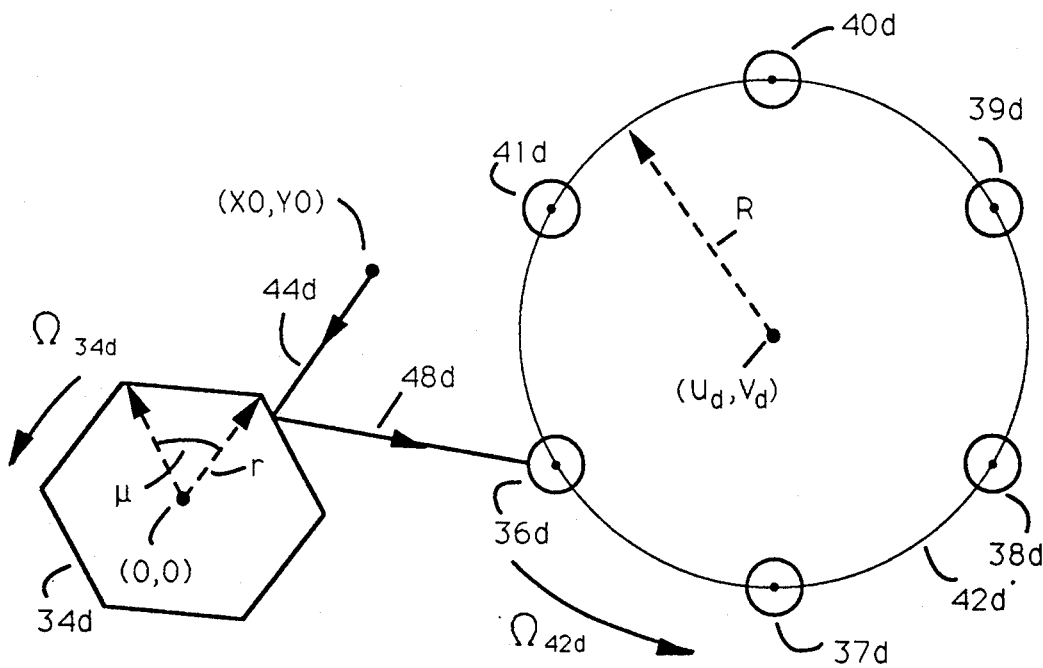

In general, according to the invention, the system for accurate tracking with deviation fro linearity within the desired range can be realized in four different embodiments, which are shown in FIGS. 7(a) through 7(d). FIGS. 7(a) to 7(d) are diagrams illustrating a method of the invention for accurate tracking with the use of conventional polygon. In FIG. 7(a) the polygon and the carousel are on the same axis of rotation. In FIG. 7(b) the center of rotation of the carousel is shifted off the center of rotation of the polygon to the position of negative coordinates in the XY coordinate system, but the polygon is still within the contour of the carousel. In FIG. 7(c) the center of the rotation of the carousel is shifted off the center of rotation of the polygon to the position of positie coordinates in the XY coordinate system, but the polygon is still within the contour of the carousel. In FIG. 7(d) the carousel is mounted off the polygon's axis of rotation and is beyond the carousel's area.

Each system type will now be further explained separately.

FIG. 7(a)—Polygon-Carousel Having a Common Axis of Rotation

One the most needed applications in industry is to track industrial products on a rotating carousel havint the same axis of rotation as a polygon. The scanning system of FIG. 7(a), which isused for this purpose, has a polygon 34a, which rotates with angular speed $\Omega_{34a}$ around axis (0,0) [which is a center of coordinates X, Y (not shown)] and carousel 42a which rotates around the same center with angular speed $\Omega_{34a}$. Polygon 34a has a number of facets 35a. Although six facets are shown in the illustrated example, it is understood that their number may be different.

A group of glass or plastic bottles 52a-62a is mounted on carousel 42a. Although only six such bottles are shown, their number may be different and that the number of bottles may also be different from the number of facets 35a of polygon 34a. If the number of facets differs from the number of bottles, this situation is easily compensated by selecting an appropriate gear ratio between the rotational speeds of polygon 34a and carousel 42a.

The bottles have similar reference points, namely, the centers of the bottles. Only one such point 49a is shown in the center of bottle 52a in order not to complicate the description and drawings. However, each bottle has such a reference center, which is used for calculations. It is also assumed that each time the beam hits the surface of the bottle, its extension passes through the bottle's center. In reality, however, the beam is either reflected from the surface of the bottle for measurement purposes, or makes appropriate marking or engraving if it is a laser beam.

In other words the bottles are to be either inspected for flaws in the glass, or engraved with code marks using a laser scanning beam originating at point (X0,Y0).

The carousel has a radius $R_a$ and the polygon has a radius $r_a$. The polygon's angle of symmetry is $\mu_a$.

To scan bottles 52a-62a, a laser source at (X0,Y0) emits an incident beam 44a which is reflected as a tracking or reflected beam 48a from facet 35a$_i$ of polygon 34a. The beam hits bottle 52a located on the carousel. The incident beam 44a stays static in space, while a reflected beam 48 moves in space to track the movement of bottle 52a. Reflected beam 48a moves in space as a result of rotation of polygon 34a.The periodic tracking arc of beam 48a is the arc between two objects, i.e., between the center of bottle 62a and the center 49a of bottle 52a related to the center of rotation (0,0). This arc is the tracking arc and equals to the angular distance between two adjacent bottles 62a and 52a with a tracking angle of (360/n), where n is the number of bottles on carousel 42a.

As shown in FIG. 7(a), reflected beam 48a is nearly finished tracking bottle 52. The beginning of that tracking was initiated when bottle 52a was located in the current position of bottle 62a (not shown). The process is repeated as the carousel rotates and the polygon rotates. The rest of the bottles on the carousel will be tracked one by one with reflected beam 48a. It is important to emphasize that angle $\mu$ may not equal to the tracking angle.

FIG. 7(b)—Tracking system with Carousel's Center Shifted to Negative Coordinates As shown in FIG. 7(b), the axis of rotation a carousel 42b and the axis of rotation of a polygon 34b do not coincide with each other, i.e., they are located at different points. The carousel's axis of rotation is at point (0,0) which is the origin of coordinates X,Y (not shown). The rest of the system's parameters re the same as in FIG. 7(a), but designated with an addition of subscript "b". In this construction, point (0,0) is located between points $(u_b, v_b)$ and point (X0,Y0), i.e., it is located in a negative coordinate quadrant.

FIG. 7(d)—Tracking system with Carousel's Center Shifted beyond the Contour of the Polygon As shown in FIG. 7(d), the carousel's axis of rotation is located at point $(u_d, v_d)$, while the polygon's axis of rotation is located at point (0,0), which is the origin of coordinates X,Y (not shown). In other words, the carousel is shifted to a position where it is beyond the contours of the polygon. The rest of the system's parameters are the same as in the previous embodiments. In this structure, point (X0,Y0) is located between points (0,0) and $(u_d, v_d)$.

Figure 8A:
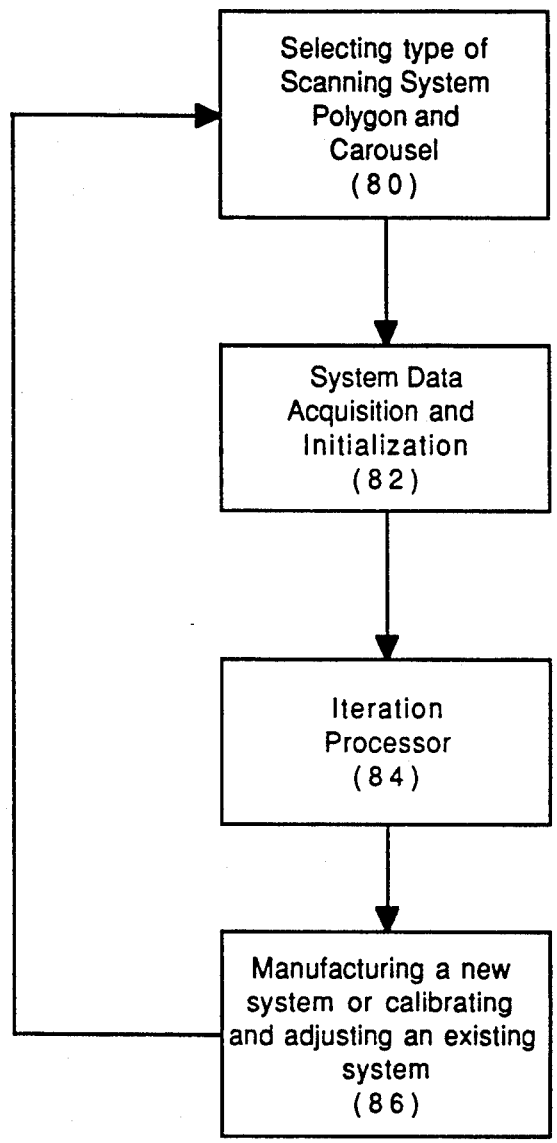
FIG. 8(a) is a general block diagram which illustrates the method of the invention.

FIG. 8(a)—General Description of the Method

FIG. 8(a) is a block diagram illustrating a flowchart of the method in the most general form.

The system type is selected at a first stage represented by block 80. Here we decided whether or not polygon 34 will have the same axis of rotation as carousel 42.

In the second stage (block 82), the system's data acquisition takes place. This stage determines and selects input parameters and appoints initial values for these parameters. The desired accuracy range for linearity of the the system also is determined in this stage.

In the third stage (block 84), iteration is performed for determining the system parameters that will insure linear tracking within the selected range of desired accuracy. The stages requested by block 82 and 84 are done by computer.

At the fourth stage (block 86) a new system having the selected parameters is manufactured, or an adjustable existing system is set and calibrated to the selected parameters, e.g., by shifting the facets along radial slots.

Having described the method in general form, we further consider each stge (block 80, 82, 84, and 86) in greater detail.

Stage 80 and 82—System Selection and Determination of Physical and Mathematical Relations between parameters First we select the system from four versions described above. This selection is normally based on specific production conditions, availability of space, dimensions of products, their configuration, output of the product line, etc. Having selected one of four embodiments described above and a set of global parameters (which will be described in detail later) appropriate for the chosen system, we can now determine physical and mathematical relations between the parameters.

Mathematical equations are established for the set of system parameters selected and shown in FIG. 4. The mathematical equations for polygon facet 46 in coordinate system (X,Y) are the following:

$$Y = -\tan(90-62)(X-X2)+Y2 \qquad (1)$$

where:

$$X2 = r\cos(\mu/2)\cos(\beta) \qquad (2a)$$

where:

$$Y2 = r\cos(\mu/2)\sin(\beta) \qquad (2b)$$

The equation for incident beam 44 in the (X,Y) coordinate system is the following:

$$Y = \tan(\S)(X-X0)+Y0 \qquad (3)$$

The solution to the sets of equation (1), (2) and (3) is a common point (X1,Y1) where lines 44 and 46 intersect. The equation for reflected beam 48 in the (X,Y) coordinate system is:

$$Y = \tan(2\times\beta-\S)(X-X1)+Y1 \qquad (4)$$

The equation for circumference of the carousel is $$Y = (R^2-X^2)^{0.5} \qquad (5)$$

The solution to the set of equations (4) and (5) is a common tracking point (X3,Y3), where line 48 and the tracking circumference intersect.

The tracking angle ∂ (gamma) is:

$$\partial = \arccos(X3/R) \qquad (6)$$

The above equations were derived for the case where the carousel and the polygon share a common axis as shown in FIG. 4. For the case where the polygon does not share a common axis with the carousel, as shown in FIG. 7(b) to 7(d), equations (5) and (6) are modified as follows:

$$Y = [R^2-(X-u)^2]^{0.5}+v \qquad (5a).$$

$$\partial = \arccos((X3-u)/R) \qquad (6a).$$

Equations (5) and (6), or (5a) and (6a), can be solved with two possible values of (X3,Y3). One possible value where X3>u is shown in FIGS. 7(a) to 7(c). The second possible value where X3<u is shown in FIG. 7(d).

As has been stated before, it is important to emphasize that the scanning system using a conventional polygon will have perfect linear scanning characteristics only for one unique ratio between the carousel's radius and the polygon's radius. For arbitrary values, the system's scanning behavior is nonlinear. However, the method provides a way of calibrating and adjusting the scanning system parameters for improving the linearity of the scanning system's behavior within a desired range of accuracy. In other words, the scanning behavior will resolve in tracking a fixed point on the rotating carousel within a required accuracy.

As shown in FIG. 4, the rotation angle of the polygon 34 is indicated by angle $\beta$. Rotation of polygon 34 from an initial state position corresponding to angle $\beta_1$ (not shown) to a final position corresponding to angle $\beta_2$ (not shown), where $(\beta_1-\beta_2)=\mu$ (the polygon's angle of symmetry), will change tracking angle ∂ from $\partial_1$ to $\partial_2$. In the case of linear tracking, the arc will be defined as $(\partial_1-\partial_2)\times R$ and will be equal to an angular distance between two adjacent bottles on the carousel 42.

The method of the invention makes it possible to chose parameters of the system for tracking bottles on the carousel with accuracy within a desired allowable range of deviations from theoretical linearity.

Figure 8B:
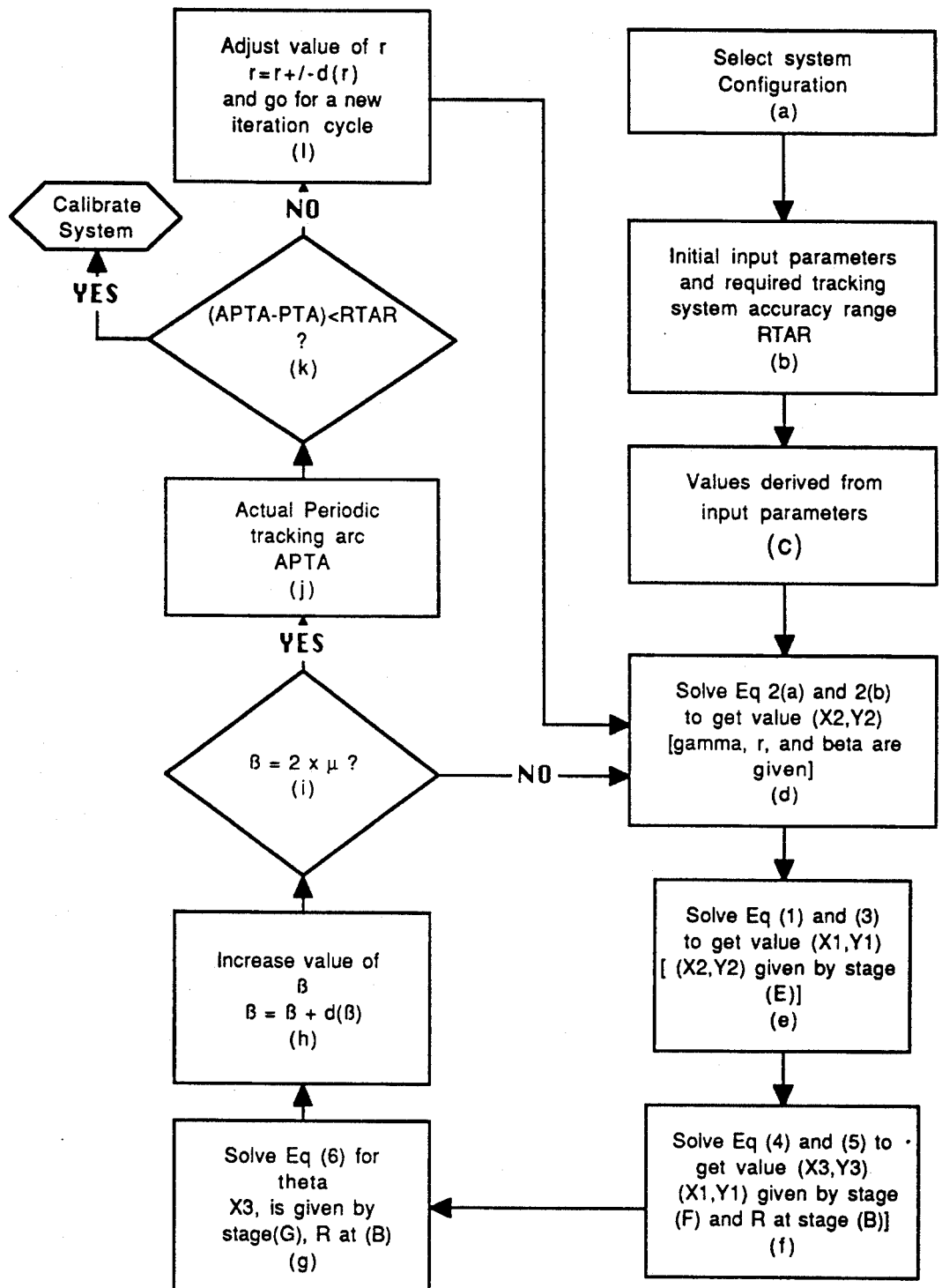
FIG. 8(b) is more detailed flowchart of the method of the invention.

FIG. 8(b)—Iteration Stage 84

After the selection of mathematical equations which define relationships between the parameters of the system, we now can start solving these equations by an iteration method. Iteration is a process for calculating a desired result by means of a repeated cycle of operations which comes closer and closer to the desired result. FIG. 8(b) is a flowchart of the iteration process used in the method of the invention.

As indicated by the first block (on the right upper side of FIG. 8(b)) the system configuration is selected from four embodiments described in connection with FIGS. 7(a)-7(d).

The next step is selection of a group of system parameters that will correctly define the system. An example of one possible set is the following:

Step (a)

Use the following parameters
1) coordinates (X,Y)
2) the polygon's axis of rotation is point (0,0)
3) the carousel's radius R
4) the polygon's radius r
5) the carousel's axis of rotation is (u,v)
6) the number of objects on the carousel Nc
7) the laser source or camera location (X0,Y0)
8) the laser source or camera alignment angle §
9) the number of facets in the polygon, Np
10) the desired tracking system accuracy range (DTAR)
11) the number "n" of incrementing rotational angle
12) the initial adjustment value of polygon's radius r, d(r)

Step (b)

Provide the following initial input values for the parameters
1) the carousel's radius R=40 cm
2) the polygon's radius r=0.98×R=39.20 cm
3) the carousel's axis of rotation is (u,v)=(0,0)
4) the number of objects on the carousel Nc=10
5) the laser source or camera location (X0,Y0)=(50,50)
6) the laser source or camera alignment angle §=0.7853983 radian
7) the number of facets in the polygon, Np=12
8) the desired tracking system accuracy range (DTAR)=0.0001 cm
9) the polygon's initial rotation angle $\Theta = \mu$
10) the number of times rotational angle is incremented n=10

Step (c)

Calculate the following additional parameters
1) the polygon's rotational angle Mu, $\mu = 2 \times PI / Np = 0.5235989$ rad
2) the periodic tracking angle PT=2×PI / Nc=0.6283186 radian
3) the periodic tracking arc PTA=PT×R=25.13275 cm
4) the carousel's angular velocity / polygon's angular velocity $=(\Omega_{42}/\Omega_{34})=WR=Np / Nc=1.2$
5) the incrementing value of rotational angle $d(\beta)=\mu / n = 0.05235989$ 6) the initial adjustment value of polygon's radius r d(r)=R / 1000=0.04 cm

Step (d)

Solve equations (2a) and (2b) for (X2,Y2)

$$X2 = r \cos(\mu/2) \cos(\beta) \quad (2a)$$

$$Y2 = r \cos(\mu/2) \cos(\beta) \quad (2b)$$

As values for r, $\beta$ and $\mu$ are known and are the same as in step (c) above, coordinates (X2,Y2) can be calculated.

Step (e)

Solve equations (1) and (3) for (X1,Y1)

$$Y1 = -\tan(90-\beta)(X1-X2)+Y2 \quad (1)$$

$$Y1 = \tan(\S)(X1-X0)+Y0 \quad (3)$$

As values $\beta$, §, (X0,Y0), and (X2,Y2) are known and are the same as in step (b), (c), and (d), the values of coordinates (X1,Y1) can be calculated.

Step (f)

Solve equations (4) and (5) for (X3,Y3)

$$Y3 = \tan(2 \times \beta - \S)(X3-X1)+Y1 \quad (4)$$

$$Y3 = (R^2 - X3^2)^{0.5} \quad (5)$$

As values for §, $\beta$, (X0,Y0), (X2,Y2), R, and (X1,Y1) are known and are the same as in step (b), (c), (d), and (e), the value of coordinates (X3,Y3) can be calculated.

Step (g)

Solve equations (6) for the value of angle ∂

$$\partial = \arccos(X3/R) \quad (6)$$

As values for R and X3 are known and are the same as in steps (b) and (e), the values of angle ∂ can be calculated.

Step (h)

Increasing rotation angle by a small increment $$\beta' = \beta + d(\beta)$$

Since the initial value or rotation angle $\beta$ was chosen (arbitrarily) to be equal to $\mu$, we obtain the following:

$$\beta' = \mu + d(\beta) \times n, \text{ where } n=1, \ldots, 11.$$

As values for $\mu$, n, and $d(\beta)$ are known and are the same as in step (c), the value of rotation angle $\beta$ can be calculated for each increment of rotation.

Step (i)

Has polygon 34 been turned for a full symmetry angle $\mu$?

$$\beta = 2 \times \mu?$$

This is because we started rotation from the initial position $\beta = \mu$. For full symmetry the polygon must be turned through another angle equal to $\mu$.

If the answer to the above question is not positive, then we have to continue repeating steps (d) to (i) until the rotational angle satisfies the above condition. While incrementing the rotation angle, all intermediate values are stored in the memory of the computer. In the current example the rotation angle will be incremented in ten steps.

Step (j)

Calculate actual periodic tracking arc (APTA)

$$APTA = (\partial_{10} - \partial_i) \times R,$$

where $\partial_i$ is the value of $\partial$ in the initial position, and $\partial_{10}$ is the value of $\partial$ after ten increments in the rotation of polygon 34.

Step (k)

Calculate tracking system accuracy (TSA)

$$TSA = abs(APTA - PTA)$$

$$TSA < DTAR$$

The absolute value must be between the actual periodic tracking arc and the desired one, i.e., it must be within the range of the desired tracking system accuracy range (DTAR). If this is the case, the iteration loop is stopped, and the parameter values are outputted and used as basis for adjusting and calibrating physical dimensions of the system.

In case the desired accuracy is not achieved, the value of r is adjusted by decreasing or increasing as explained in the next step (1).

Step (1)

Adjust the polygon's radius by a small value $$r' = r \pm d(r)$$

In case that the desired accuracy is not achieved, the value of r is changed by a small amount, e.g., by repeatedly decreasing it by value d(r), and repeating steps (d) to (1). If the accuracy improves, the process is continuously repeated until the desired accuracy is achieved. If the decrease in the value of r makes the accuracy worse, the radius r is increased by the value d(r), and steps (d) to (1) are repeated until the desired accuracy is achieved.

While changing the polarity of the adjustment of value r, the value of d(r) is also changed (decreased). This is done to prevent endless loop of interation. For example increasing r by a value d(r) and then decreasing it by the same value d(r) will not get any conversion of r. We will get oscillations of r around the same value. This is what we trying to prevent by changing the value of d(r). E.g., d(r) can be reduced by 1%.

When the desired accuracy is reached, the parameter values are used as design data for constructing the polygon-carousel system, or as input data for calibrating the system after assembly.

The procedure given above is only one example of how mathematical equations (1) to (6) can be solved. These equations can be solved by any other method, as a trial-and-error method, a mid-section point method, a Newtonian successive derivatives method, or the like.

Iteraction between the above parameters and their physical meaning will be better understood after the operation of the system is described.

Incident beam 44 originates at point (X0,Y0) and hits facet 46 at point (X1,Y1) with an angle § (Sigma) to ordinate axis X'. (Ordinate axis X' is parallel to ordinate axis X). The beam is reflected as tracking beam 48 with an angle $(2 \times \beta - §)$ to ordinate X' and intersects the tracking circumference at point (X3,Y3). Incident beam 44 is static in space. Point (X1,Y1) on facet 46 slides along the facet when polygon 34 rotates.

Reversing the propagation of the beam, i.e., making beam 48 incident and beam 44 reflected, will describe a reading, instead of writing situation. Light beam 48 from a light source behind the point (X3,Y3) (not shown), propagates from a bottle mounted at point (X3,Y3) (not shown). The light beam incident upon facet 46 and reflected as beam 44. In this case a light sensor, such as a camera (not shown) is placed at point (X0,Y0).

Figure 5:
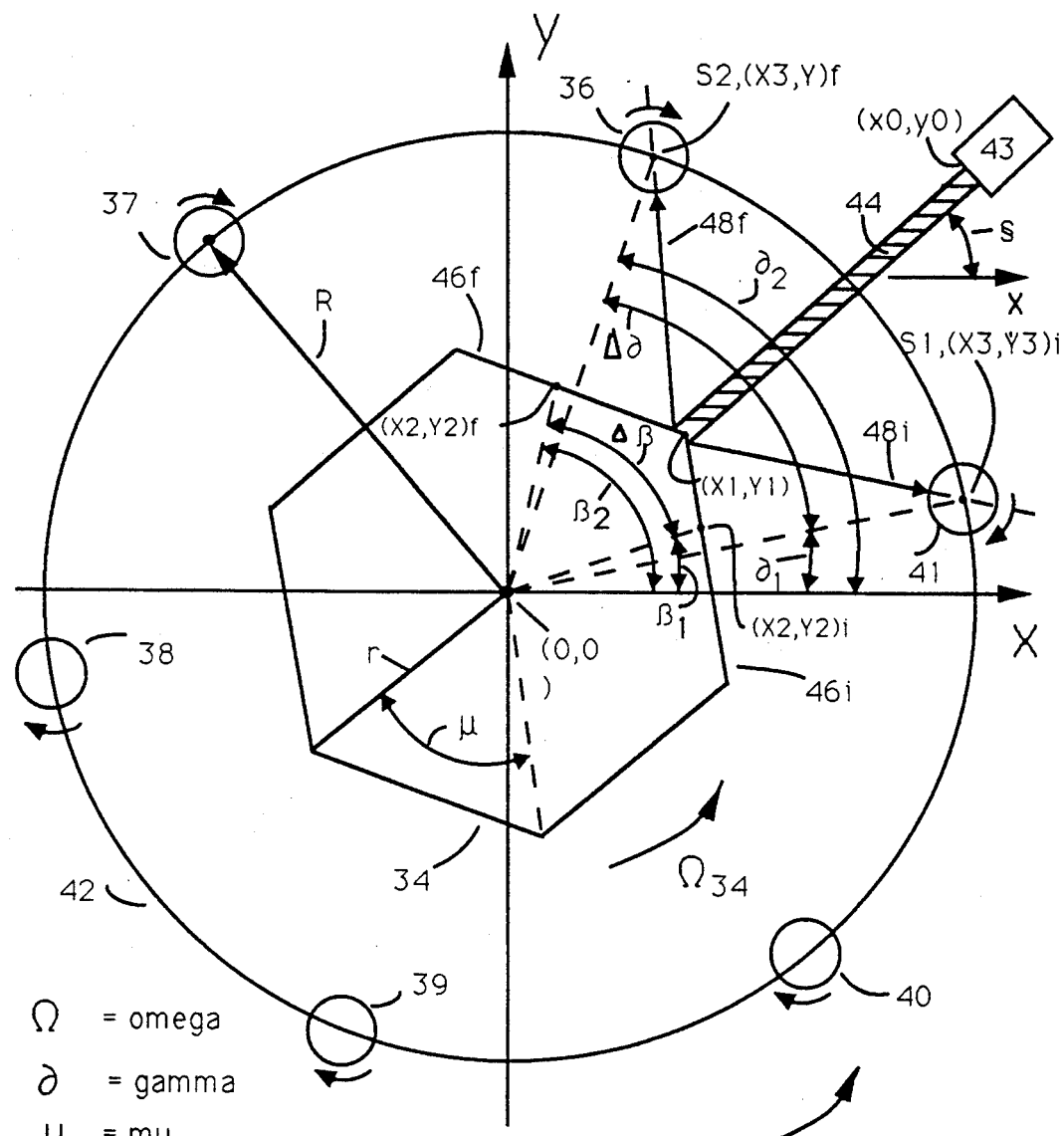
FIG. 5 illustrates static adjustment of tracking system parameters in accordance with the invention for the system of FIG. 4.

FIG. 5—Static Adjustment of Tracking System Parameters

FIG. 5 demonstrates a static way to adjust the tracking system parameters. This example relates to static adjustment of the polygon's radius r.

The system has a coordinate system (X,Y). A carousel 42 and a polygon 34 have a common axis of rotation (0,0) and rotate with angular speeds $\Omega_{42}$ and $\Omega_{34}$, respectively, and have respective radii R and r. Bottles 36 to 41 are distributed uniformly around carousel 42. An incident beam 44 originates at a fixed point (X0,Y0), e.g. from a laser source 43, and forms an angle § to coordinate axis X', which is parallel to axis X.

A subscript index i and subscript index f indicate initial and final states of periodic tracking. Incident beam 44 is wide enough to split the incident beam at point (X1,Y1) into two reflected beam branches 48f and 48i, which are reflected from facet 46f and 46i, respectively, toward bottle 36 at point S2 = (X3,Y3)f and bottle 41 at point S1 = (X3,Y3)i.

The symmetry angle of the polygon is $\mu = (\beta_1 - \beta_2)$, where $\beta_1$ and $\beta_2$, are initial and final angles of rotation of the polygon. The rotation angles are measured between ordinate X and points (X2,Y2)i and (X2,Y2)f, respectively. The tracking angle is equal to $(\partial_2 - \partial_1)$, where $\partial_1$ and $\partial_2$ are initial and final tracking angles, respectively. The periodic tracking arc defined between points S2 = (X3,Y3)f and S1 = (X3,Y3)i must be equal to the arc between two adjacent bottles on the carousel, i.e., bottles 36 and 41.

If that is not the case, the radius of the polygon must be increased or decreased, depending upon whether the tracking angle has a smaller or greater arc than the arc between points S1 and S2, which are centers of the respective objects 41 and 36.

Figure 6A:
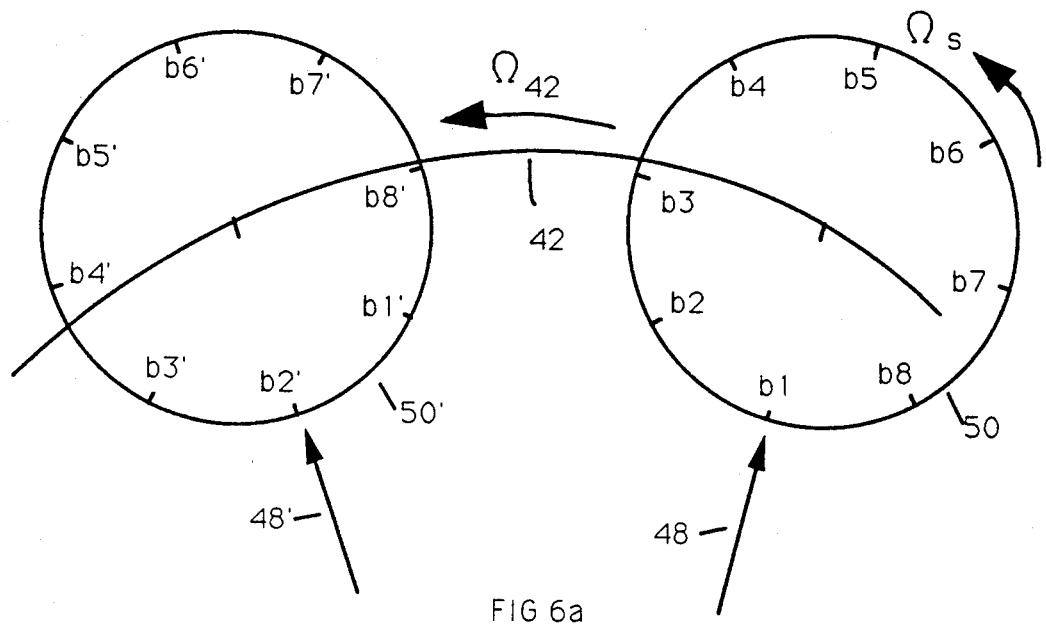
FIG. 6(a) illustrates perfect linear tracking in accordance with the invention.

FIG. 6(a)—Perfect Linear Tracking

FIG. 6(a) illustrates perfect linear tracking of a bottle 50 on a carousel 42. The objects spins with an angular speed $\Omega_s$, and the carousel rotates with an angular speed $\Omega_{42}$. The circumference of object 50 is marked with equally spaced points b1 to b8. FIG. 6(a) is an enlarged view of a section on the carousel that follows bottle 50 from its initial position to a second position 50'. In the initial position, incident tracking beam 48 hits the objects 50 in point b1. As the carousel rotates, the beam follows the spinning objects. After a time interval t1, beam 48' will hit the object at point b2. After another time interval t2, beam 48' will hit the object at point b3. I.e., at equal time intervals t1, t2, . . . , tn the incident beam hits the surface of the spinning bottle at equally spaced points on the circumference of the bottle. Equality of these intervals is used as a measure of linearity of tracking.

Thus, linearity is considered perfect if the intervals between the beam hit points on the periphery of the object are equal.

Figure 6B:
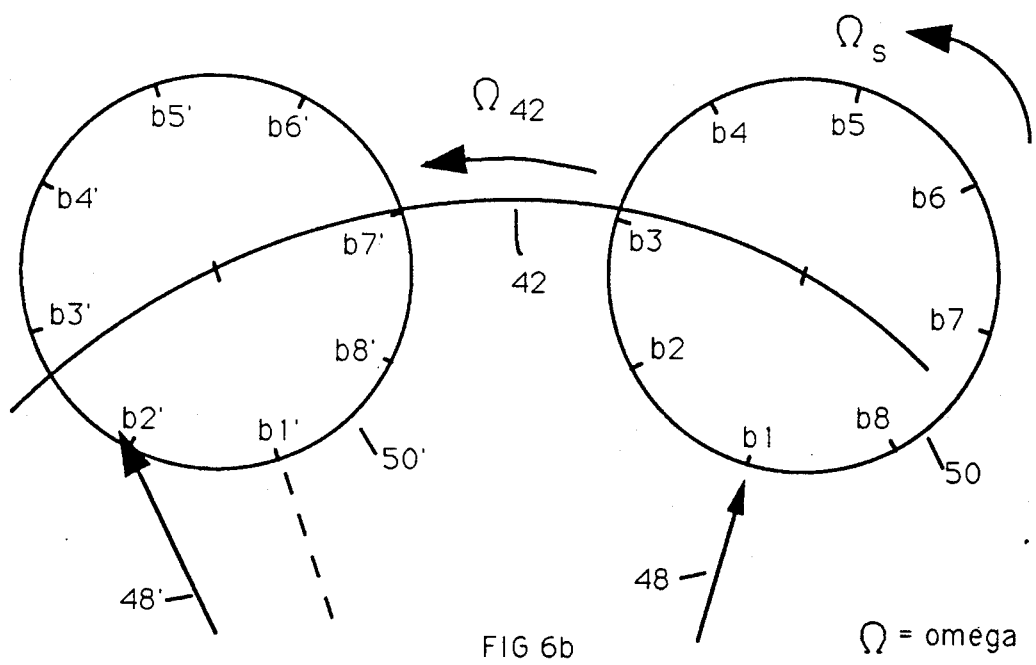
FIG. 6(b) illustrates advanced non-perfect tracking in accordance with the invention.

FIG. 6(b)—Advance Non-Perfect Tracking

FIG. 6(b) illustrates non-perfect linear tracking of bottle 50 on a carousel 42. The hardware is exactly like that in FIG. 6(a), buth the diagram illustrates nonlinear tracking, where the incident beam 48′, after an interval of time t1, is ahead of a perfect linear beam as shown by the broken line. After another time interval t2, beam 48′ will miss the bottle completely, i.e., it will be ahead of it.

Figure 6C:
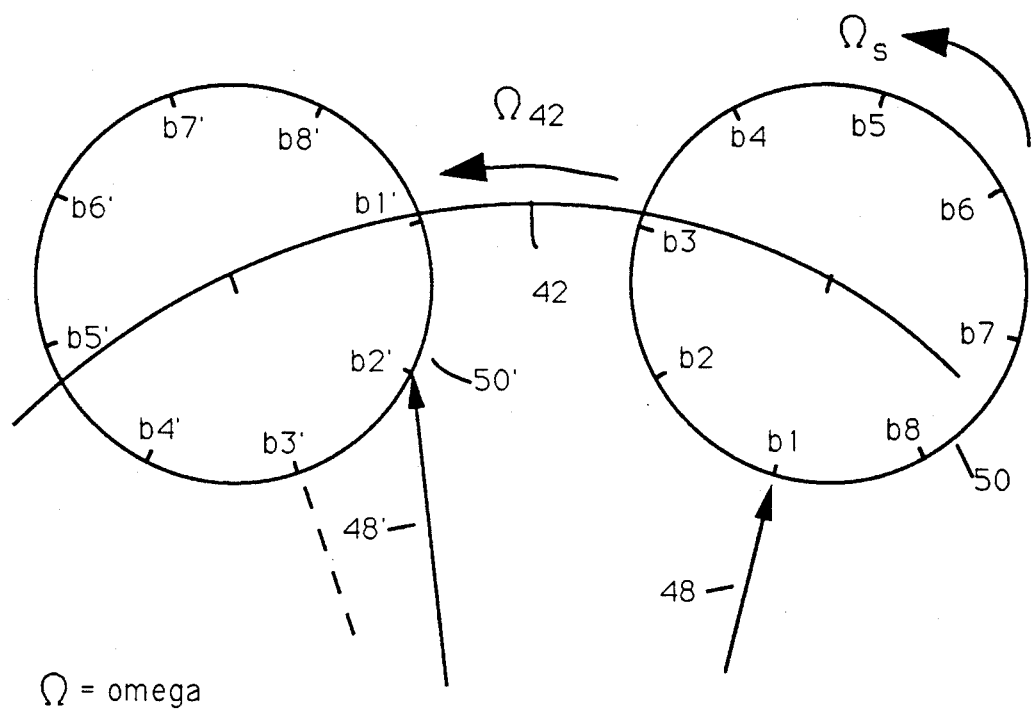
FIG. 6(c) illustrates delayed non-perfect tracking in accordance with the invention.

FIG. 6(c)—Delayed Non-Perfect Tracking

FIG. 6(c) illustrates non-perfect linear tracking of bottle 50 on a carousel 42. The hardware is exactly like in FIG. 6(a), but the diagram illustrates nonlinear tracking where the incident beam 48′, after an interval of time t1, is delayed with respect to the perfect linear beam, as shown by the broken line. After another time interval t2, beam 48′ will completely miss the bottle, i.e., it will be behind the bottle.

FIG. 8(a) Manufacturing or Calibrating the System—Stage 86

If the system is designated for controlling products in a mass production operation and the system does not require frequent adjustment, e.g., the bottles being inspected are of the same type, it is advantages to manufacture a new system with the parameters selected by the method of the invention.

For small-batch production where product and dimensions vary, it is expedient to have a more universal and adjustable construction.

Figure 8C:
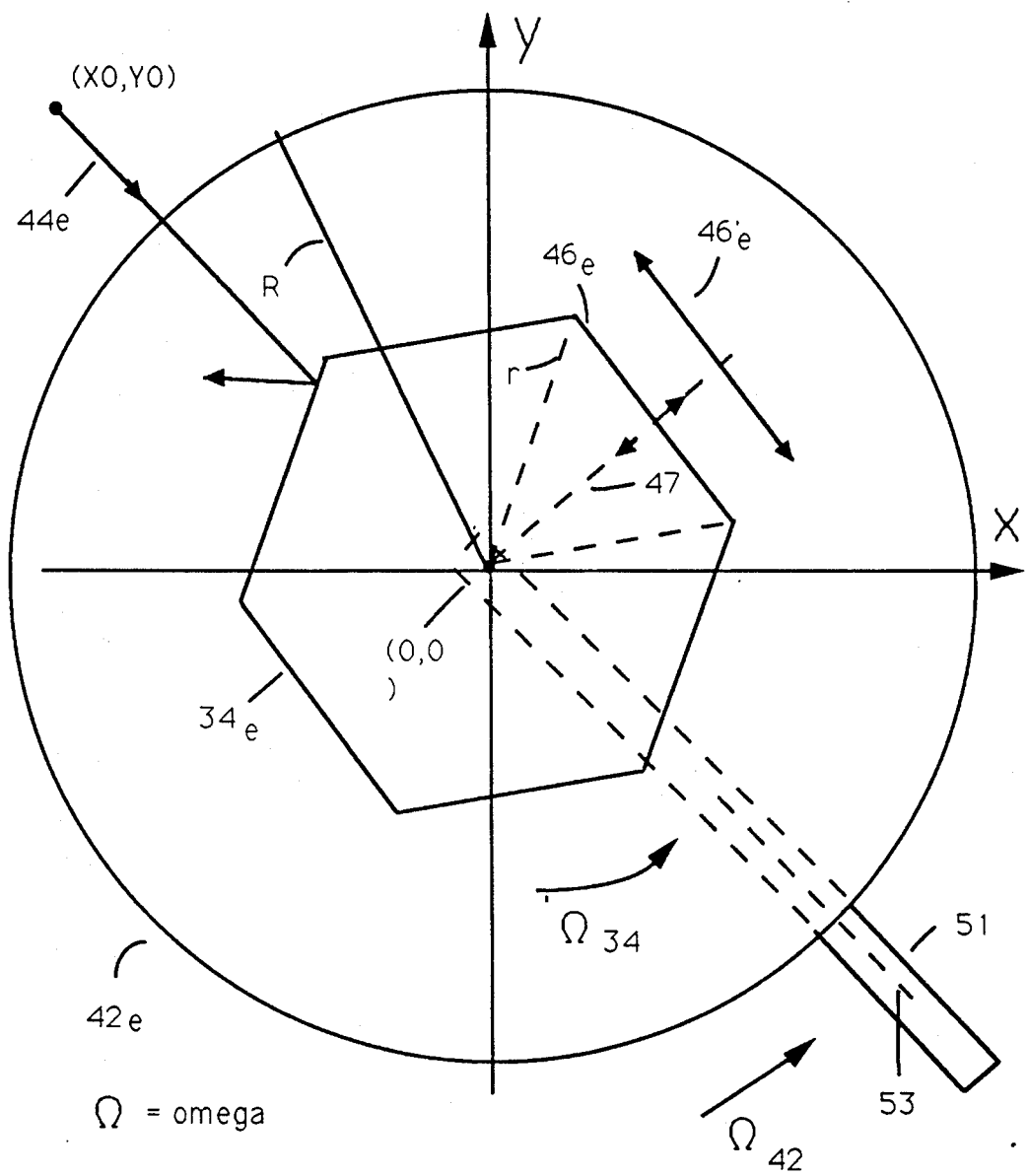
FIG. 8(c) is a schematic view of an adjustable scanning system of the invention.

FIG. 8(c) Adjustable system—Stage 86

An example of such an adjustable system is shown in FIG. 8(c). It can be seen that it consists of a carousel 42e, a polygon 34e, and a light source 44e at point (X0,Y0), etc. All of these elements are in fact the same as those in any of the four embodiments described in FIGS. 7(a) to 7(d).

However, the position of the carousel's center $(u_e, v_e)$ can be shifted with regard to the fixed center (0,0) of polygon 34e, e.g., by providing the surface of carousel with a network of openings 49, into which a central axle (not shown) of polygon 34e can be selectively inserted. The openings are shown only as an example and may be replaced, e.g., by radial or any other slots. For embodying the system into the version of FIG. 7(d), the polygon can be rigidly connected to a radial arm 51 having a longitudinal slot 53. The arm should be longer than the radius of the carousel. The central axle (not shown) of carousel 42e can be shifted along slot 53 into any radial position and fixed in this position, e.g., by a bolt and a nut (not shown). Facets 46₃ may also be made adjustable in the direction of the facet's width, e.g., by making each of the mirror facets of two telescopically connected mirrors (not shown). Thus when the radial positions of facets 46 are extended (along broken line 47), the widths of facets can be extended, as shown by the dashed lines in FIG. 8c.

Thus, the scanning system has means for shifting the axis of rotation of the carousel with respect to the axis of rotation of the polygon and for fixing the shifted axis in the shifted position, and means for adjusting the length of a perpendicular from the center of rotation of the polygon to its facet. Slot 53 in radial arm 51 comprises means for guiding the axis of rotation of the carousel along the radial arm, and the bolts comprise means for fixing the axis of rotation of the carousel in an arbitrary radial position on the arm.

FIG. 9—Table I—An Output Of Iteration Example

FIG. 9 (Table I) shows an exemplary output print of calculations which have been carried out using iteration described above in Step (b) with reference to FIG. 8(b) and initial data taken from this step.

The iteration loop is stopped at stage (k) of FIG. 8(b), when linearity is within the desired accuracy. The results are as follows:

The polygon's radius r=16.63289 cm.

While the polygon rotates (FIG. 4), angle $\beta$ is increased in ten steps, from the initial value of 0.5235988 radian to the final value of 1.047198. As a result, angle $\partial$ is increased also in ten steps, from the initial value of 0.4712391 radian to the final value of 1.099558 radian.

Angle $\partial$ is the tracking angle and $d(\partial)$ is an increment in $\partial$ as a result of rotation of polygon 34. The length S of the tracking is equal to $(R \times \partial)$. The value of d(S) is an increment in S as a result of rotation of the polygon by an angular increment $d(\beta)$.

FIG. 9 also contains intermediate values of increments in tracking angle $d(\partial)$, corresponding values of S, and increments d(S).

The value of an actual periodic tracing arc may be defined as follows:

$$APTS = (\partial_{10} - \partial_i) \times R$$

After inserting quantitative values form Table 1 into the above expression, we obtain the following:

$$APTA = 0.6283188 \times 40 = 25.132725 \ cm$$

In this example we reached the value of PTA (which, as has been mentioned earlier in Step (c), is equal to 25.13275) to the desired accuracy.

FIG. 10—Table II—An Output of Iteration Example—Checking the Validity of the Method on a System Having a Gear Ratio Equal to 1

This example verifies the validity of the method of the invention by comparing the results of calculations with the parameters of an existing system which operates with theoretical linearity.

The system selected as a reference is the one constructed in accordance with our U.S. patent application Ser. No. 07/680,306. This scanning system consists of a polygon and a carousel and insures linearity only when the polygon's radius is equals one-half of tracking radius R, divided by the cosine of an angle of 180/n, where n is an integer equal to the number of objects on the carousel. In this sytem the ratio between the rotational speed of the carousel and the polygon is equal to one.

The physical dimensions of the system obtained as a result of calculations by the method of the invention may be compared with those of the reference system.

If the comparison shows that both systems are equal within the given range of accuracy, this will confirm the validity of our method.

FIG. 10 shows an output print of a system for which the following initial values are selected:

carousel's radius R=40 cm
polygon's radius r=0.98×R=39.20 cm
carousel's axis of rotation (u,v)=(0,0)
number of objects on the carousel Nc=12
laser or camera location (X0,Y0)=(50,50)
laser and camera alignment angle=0.7853983 radian
number of facets in the polygon Np=12
desired tracking system accuracy range DTAR=0.0001 cm
polygon's initial rotating angle $\beta = \mu$
Number (n) of steps of incrementing rotational angle, n=10

Other parameters polygon's rotation angle $\mu$=2×PI / Np=0.5235989 rad
periodic tracking angle PT=2×PI / Nc=0.5235989 rad
periodic tracking arc PTA=PT×R=20.94396 cm
carousel angular velocity / polygon angular velocity=WR=($\Omega_{42}$) / ($\Omega_{34}$)=WR=Np / Nc=1
Incrementing value of rotation angle d($\beta$)=$\mu$/n=0.5235989
Adjustment value of polygon's radius r, d(r)=R / 1000=0.04 cm The iteration loop was stopped at stage (k) of FIG. 8(b), when linearity was within the required range. The results are as follows:

polygon's radius r=20.70548 cm
While the polygon rotates, angle $\beta$ is increased in ten steps, from the initial value of 0.5235988 radian to the final value of 1.047198. As a result, angle $\partial$ is advanced also in ten steps, from the initial value of 0.5235985 radian to the final value of 1.047198 radian.

FIG. 10 also contains intermediate values of tracking angle increments (d($\partial$)), corresponding values of arc S, and its increments d(S).

The value for the actual periodic tracking arc can be expressed as follows:

$$APTA = ((\partial_{10}) - (\partial_i)) \times R$$

After inserting quantitative values from FIG. 10, we obtain the following:

$$APTS = 0.5235996 \times 40 = 20.94399 \text{ cm}$$

Periodic tracking arc PTA=20.94396 cm. It can be seen that in this example the value of PTA is reduced to the desired accuracy of six digits.

For the sake of comparison, the polygon's radius will now be calculated by means of the equation from the method described in our above patent application Ser. No. 07/860,306.

More specifically, r=0.5×R / cos (180/n)=0.5×40 / cos (180/12)=20.70548 cm. This means that in calculating the polygon's radius r, we obtain the same results in both approaches.

FIG. 11—Table III—An Output Of Iteration Example—Checking the Method on a System Having a Gear Ratio of 2

This verifies the validity of the method on a system having a gear ratio such that the speeds of rotation of the carousel and the polygon are equal to 2. I.e., WR=2, which is equivalent to a scanning system composed of a mirror mounted on the axis of rotation of the carousel. In this case the method of the invention should result in defining a scanning system having a polygon of a very small radius for matching the scanning results with the mirror mounted at the center of the carousel.

If the calculation gives such results, the validity of the method will be confirmed for the second time.

FIG. 11 shows print out with the results of calculation for the system configuration having the following initial values:

carousel's radius R=40 cm
polygon's radius r=0.98×R=39.20 cm
carousel's axis of rotation (u,v)=(0,0)
number of objects on the carousel Nc=6
laser or camera location (X0,Y0)=(50,50)
laser and camera alignment angle=0.7853983 radian
number of facets in the polygon Np=12
desired tracking system accuracy range DTAR=0.0001 cm
polygon's initial rotating angle $\beta = \mu$
number (n) of incrementing rotational angle, n=10

Other parameters polygon's rotation angle=2×PI / Np=0.5235989 radian
periodic tracking angle PT=2×PI / Nc=1.047198 radian
periodic tracking arc PTA=PT×R=41.88791 cm
carousel angular velocity / polygon angular velocity=WR=($\Omega_{42}$) / ($\Omega_{34}$)=WR=Np / Nc=2
incrementing of rotation angle d($\beta$)=$\mu$ / n=0.05235988
Adjustment value of polygon's radius r, d(r)=R / 1000=0.04 cm The iteration loop was stopped at stage (k) of FIG. 8(b), when linearity was within the required range. The results are as follows:

polygon's radius r=2.059937×10$^{-04}$ cm.
While the polygon rotates, angle $\beta$ is advanced in ten steps, from the initial value of 0.5235988 radian to the final value of 1.047198. As a result angle $\partial_a$ is advanced also in ten steps, from the initial value of 0.2618027 radian to the final value 1.308994 radian.

FIG. 11 also contains intermediate values of tracking angle increments d($\partial$), the corresponding values of arc S, and its increments d(S). The value for the actual periodic tracing arc is the following: APTA=($\partial_{10} - \partial_i$)×R.

After the insertion of quantitative values from FIG. 11 we obtain the following: APTA=1.047192×40=41.88767 cm. Periodic tracking arc PTA=41.88791 cm.

In this example we obtained the value of PTA to the desired accuracy of five digits.

On the basis of the above comparison we can make a conclusion that the polygon's radius r=2.059937×10$^{-04}$ cm is very small and can be considered as a value which approaches zero. This means that the polygon approaches the behavior of a mirror at the center of the carousel. In other words, the validity of the method is confirmed for a the third time. Each time confirmation has been achieved with a different approach.

SUMMARY, RAMIFICATIONS, AND SCOPE

Thus it has been shown that we have provided a method and apparatus for calibrating and adjusting physical dimensions of a scanning system with improved linear scanning behavior. The method and apparatus makes it possible to improve reading and writing of products with the use of a conventional polygon, while the products are moving on a production line, and to improve accuracy of tracking a fixed point on a rotating carousel.

We also have provided a scanning system which has dimensions deviating from the unique relationship between the polygon and the carousel, and which, at the same time, allows deviation from linearity within the desired tolerable range.

The system consists of a carousel for rotating objects to be scanned and a polygon with radially and laterally adjustable facets. The axis of the carousel can be shifted with respect to the axis of the polygon.

While the above description contains many specificities, these should not be construed as limitations on the scope of the invention, but as exemplifications of the presently preferred embodiments thereof. Many other ramifications and variations are possible within the teachings to the invention. For example the polygon can be produced with a different number of sides, different radii, and different angles according to equations 1 to 6. It also can be used as a mirror system when only parts of the polygon are built. Although the invention been described using the example of scanning of bottle, it can be used to scan or inspect other objects, such as printed matter, glass, mechanical, electronic, or optical parts.

Although the center of rotation of the carousel was shown as moveable with respect to the fixed center of the polygon, the situation can be reversed, i.e., the center of the polygon can be moved with respect to the center of the carousel.

Thus the scope of the invention should be determined by the appended claims and their legal equivalents, and not by the examples given.

We claim:

1. A method of calibrating and improving linearity of a system for scanning moving objects, comprising the steps of:
   (a) providing a scanning system which comprises:
      (1) a rotating carousel comprising a rotatable platform having an axis of rotation, said rotatable platform being arranged to hold at least one object mounted thereon in a position spaced from said axis of rotation,
      (2) a rotating polygon having predetermined axis of rotation, said polygon having a plurality of facets which are symmetric with respect to said axis of rotation, said polygon being mounted directly upon said axis of rotation, each facet of said polygon comprising a mirror, each mirror facing away from said axis of rotation, said polygon being mounted upon said axis of rotation of said rotatable platform,
      (3) light means for directing an incident light beam toward the center of said polygon so that it impinges upon said polygon at an angle to said axis of rotation of said polygon, and is reflected from said polygon and intersects a fixed point on said carousel with linearity within a predetermined accuracy, and
      (4) spinning means for spinning said object around its axis on said carousel at said position spaced from said axis of rotation of said carousel,
   (b) selecting a set of parameters consisting of:
      a) said polygon's axis of rotation at point (0,0)
      b) said carousel's radius R
      c) said polygon's radius r
      d) said carousel's axis of rotation (u,v)
      e) the number of objects mounted on said carousel, Nc
      f) the location of said light means (X0,Y0)
      g) the alignment angle § of the incident light to said polygon's facet
      h) the number of said facets on said polygon, Np
      i) a desired tracking system accuracy range (DTAR) to define said scanning system and a set of initial values for a plurality of said parameters,
   (c) deriving a plurality of mathematical equations which describe physical movements of said scanning and a plurality of relationships between said parameters,
   (d) solving said equations to find a plurality of values for said parameters with which said object is scanned by said incident light with linearity within said desired tracking system accuracy range (DTAR), and
   (e) adjusting said parameters of said scanning system to said values obtined by solving said equations.

2. The method of claim 1 wherein said light means comprises a laser source.

3. The method of claim 2 wherein said laser source is arranged to provide a light beam suitable for engraving marks on said object.

4. The method of claim 2 wherein said laser source is arranged to provide a light beam which is directed onto a point of intersection between two adjacent facets of such polygon for splitting said laser beam into two reflected laser beams, which are directed each onto one of adjacent objects for checking the correctness of said selected parameters and for subsequent calibration of said system in accordance with the results of said checking.

5. The method of claim 1, further including a light sensor, said light sensor being positioned to detect said light reflected from said polygon for taking an image of said object for further processing.

6. The method of claim 5 wherein said light sensor is a video camera.

7. The method of claim 1 wherein said axis of rotation of said polygon and said axis of rotation of said carousel coincide.

8. The method of claim 1, wherein axis of rotation of said polygon and said axis of rotation of said carousel do not coincide.

9. The method of claim 8 wherein said axis of rotation of said polygon is within the contours of said carousel.

10. The method of claim 8 wherein said axis of rotation of said polygon is beyond the contours of said carousel.

11. The method of claim 1 wherein said object is a bottle.

12. The method of claim 1 wherein at least one of said parameters which are being set is a radius of said polygon which is a distance from the center of rotation of said polygon to a point of intersection between two adjacent facets.

13. The method of claim 1 wherein solving of said equations is performed by iteration.

14. The method of claim 1 wherein said scanning system has means for shifting said axis of rotation of said carousel with respect to said axis of rotation of said polygon and for fixing said shifted axis in said shifted position, and means for adjusting a length of a perpendicular from the center of rotation of said polygon to its facet.

15. The method of claim 14 wherein said means for shifting comprises a radial arm attached to said axis of rotation of said polygon and has means for guiding said axis of rotation of said carousel along said radial arm, and means for fixing said axis of rotation of said carousel in an arbitrary radial position on said arm.

16. The method of claim 15 wherein said scanning system also has means for adjusting location and size of said facets.

17. The method of claim 15 wherein said radial arm has a length greater than the radius of said carousel.

18. The method of claim 1 wherein said predetermined accuracy of linearity is within the range of 0 to 1% of the angle of rotation of said polygon.

19. The method of claim 1 wherein said scanning system also has means for adjusting the location and size of said facets.

20. An apparatus for calibrating and improving linearity of a system, comprising:
  (1) a rotating carousel comprising a rotatable platform having an axis of rotation, said rotatable platform being arranged to hold at least one object mounted thereon in a position spaced from said axis of rotation,
  (2) a rotating polygon having a predetermined axis of rotation, said polygon having a plurality of facets which are symmetric with respect to said predetermined axis of rotation, said polygon being mounted directly upon said predetermined axis of rotation, each facet of said polygon comprising a mirror, ech mirror facing away from said predetermined axis of rotation, said polygon being mounted on said axis of rotation of said rotatable platform,
  (3) light means for directing an incident light beam toward the center of said polygon so that it impinges upon said polygon at an angle to said predetermined axis of rotation of said polygon, and is reflected from said polygon and intersects a fixed point on said carousel with linearity within a predetermined accuracy, and
  (4) spinning means for spinning said object around its axis on said carousel at said position spaced from said axis of rotation of said carousel.
  (5) said apparatus having a set of parameters defined so that said object is scanned by said incident light with linearity within said predetermined accuracy.

21. The apparatus of claim 20 wherein said light means comprises a laser source.

22. The apparatus of claim 21 wherein said laser source is arranged to provide a light beam suitable for engraving marks on said object.

23. The apparatus of claim 21 wherein said laser source is arranged to provide a light beam which is directed onto a point of intersection between two adjacent facets of such polygon for splitting said laser beam into two reflected laser beams, such beams are directed each onto one of said adjacent objects for checking the correctness of said defined parameters and for subsequent calibration of said system in accordance with the results of said checking.

24. The apparatus of claim 20 wherein said scanning system is further provided with a light sensor, said light sensor being positioned to detect said light reflected from said polygon for taking an image of said object for further processing.

25. The apparatus of claim 24 wherein said light sensor is a video camera.

26. The apparatus of claim 20 wherein said axis of rotation of said polygon and said axis of rotation of said carousel coincide.

27. The apparatus of claim 20 wherein said axis of rotation of said polygon does not coincide with said axis of rotation of said carousel.

28. The apparatus of claim 27 wherein said axis of rotation of said polygon is within the contours of said carousel.

29. The apparatus of claim 27 wherein said axis of rotation of said polygon is beyond the contours of said carousel.

30. The apparatus of claim 20 wherein said object is a bottle.

31. The apparatus of claim 20 wherein said scanning system has means for shifting said axis of rotation of said carousel with respect to said axis of rotation of said polygon and for fixing said shifted axis in said shifted position, and means for adjusting a length of a perpendicular from the center of rotation of said polygon to its facet.

32. The apparatus of claim 31 wherein said means for shifting comprises a radial arm attached to said axis of rotation of said polygon and has means for guiding said axis of rotation of said carousel along said radial arm, and means for fixing said axis of rotation of said carousel in an arbitrary radial position on said arm.

33. The apparatus of claim 31 wherein said scanning system also has means for adjusting the location and size of said facets.

34. The apparatus of claim 31 wherein said radial arm has a length greater than the radius of said carousel.

35. The apparatus of claim 20 wherein said predetermined accuracy of linearity is within the range of 0 to 1% of the angle of rotation of said polygon.

36. The apparatus of claim 20 wherein said scanning system also has means for adjusting the location and size of said facets.

* * * * *